US006890456B2

(12) United States Patent
Noda et al.

(10) Patent No.: US 6,890,456 B2
(45) Date of Patent: May 10, 2005

(54) CATHODE ELECTROACTIVE MATERIAL, PRODUCTION METHOD THEREFOR AND SECONDARY CELL

(75) Inventors: Takao Noda, Chiba (JP); Akihiko Shirakawa, Chiba (JP); Joseph Gaze, Chiba (JP); Yoshiaki Yamauchi, Nagano (JP); Fumiyoshi Ono, Nagano (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/743,873

(22) Filed: Dec. 24, 2003

(65) Prior Publication Data

US 2004/0135128 A1 Jul. 15, 2004

Related U.S. Application Data

(62) Division of application No. 09/785,258, filed on Feb. 20, 2001, now Pat. No. 6,699,618.
(60) Provisional application No. 60/214,794, filed on Jun. 28, 2000.

(30) Foreign Application Priority Data

Apr. 26, 2000 (JP) ......................................... 2000-126494

(51) Int. Cl.$^7$ ........................... H01M 4/50; H01B 1/08; C01G 45/02
(52) U.S. Cl. .................... 252/518.1; 423/599; 429/224; 264/603
(58) Field of Search ........................... 252/518.1, 520.2, 252/521.2; 423/599; 264/603; 429/224, 231.95, 218.1

(56) References Cited

U.S. PATENT DOCUMENTS 5,807,646 A 9/1998 Iwata et al.
5,911,920 A * 6/1999 Hasezaki et al. ......... 252/518.1
6,267,943 B1 * 7/2001 Manev et al. ................ 423/599

(Continued)

FOREIGN PATENT DOCUMENTS

| JP | 4-237970 | 1/1992 |
| JP | 4-14752 | 8/1992 |
| JP | 9-86933 A | 3/1997 |

(Continued)

OTHER PUBLICATIONS

Sulzer Metco Particle Size Chart, 1–sheet, 2004.*
Y. Xia et al, "Studies on Li–Mn–O spinel system (obtained from melt–impregnation method) as a cathode for 4 V lithium batteries Part V. Enhancement of the elevated temperature performance of Li/LiMn$_2$O$_4$ cells,", Journal of Power Sources, vol. 24 (1998), pp. 24–28.

*Primary Examiner*—Mark Kopec
*Assistant Examiner*—Kallambella Vijayakumar
(74) *Attorney, Agent, or Firm*—Sughrue Mion, PLLC

(57) ABSTRACT

A cathode electroactive material for use in lithium ion secondary cells, process for producing the material, and lithium ion secondary cells using the cathode electroactive material, wherein the electroactive material predominantly comprises an Li—Mn composite oxide particles with the spinel structure and particles of the electroactive material have an average porosity of 15% or less, the porosity being calculated by employing the following equation:

Porosity (%)=(A/B)×100

(wherein A represents a total cross-section area of pores included in a cross-section of one secondary particle, and B represents the cross-section area of one secondary particle), a tapping density of 1.9 g/ml or more, a size of crystallites of 400 Å–960 Å, a lattice constant of 8.240 Å or less. The cathode electroactive material of the present invention is formed of particles which are dense and spherical and exhibit excellent packing characteristics to an electrode, and exhibit high initial capacity and capacity retention percentage at high temperature.

10 Claims, 2 Drawing Sheets

|—————|
1 0 0 μm

U.S. PATENT DOCUMENTS

| | | | |
|---|---|---|---|
| 6,413,673 B1 * | 7/2002 | Kasai et al. | 429/231.95 |
| 6,673,491 B2 * | 1/2004 | Shirakawa et al. | 429/224 |
| 2001/0014421 A1 | 8/2001 | Shirakawa et al. | |

FOREIGN PATENT DOCUMENTS

| | | | | |
|---|---|---|---|---|
| JP | 10-162860 | | 6/1998 | |
| JP | 10-302767 | * | 11/1998 | H01M/4/02 |
| JP | 10-321227 | * | 12/1998 | H01M/4/58 |
| JP | 11-135119 | * | 5/1999 | H01M/4/58 |
| JP | 11-176441 | * | 7/1999 | H01M/4/58 |

* cited by examiner

|—————————|
1 0 0 μm

CATHODE ELECTROACTIVE MATERIAL, PRODUCTION METHOD THEREFOR AND SECONDARY CELL

CROSS-REFERENCE TO RELATED APPLICATION

This is a divisional of application Ser. No. 09/785,258, filed Feb. 20, 2001, now U.S. Pat. No. 6,699,618 the disclosure of which is incorporated herein by reference, which claims benefit pursuant to 35 U.S.C. §119(e)(1) of the filing date of Provisional Application 60/214,794 filed under Jun. 28, 2000 pursuant to 35 U.S.C. §111(b).

TECHNICAL FIELD

The present invention relates to a cathode electroactive material for use in lithium ion secondary cells, a process for producing the material, and a lithium ion secondary cell using the cathode electroactive material.

BACKGROUND ART

Lithium manganese composite oxides (hereinafter referred to as Li—Mn composite oxides), which are very safe and are produced from abundant natural resources, have been of interest for use as a cathode electroactive material for lithium ion secondary cells. However, Li—Mn composite oxides exhibit poor discharge capacity per amount of an electroactive material as compared with lithium cobalt composite oxides (hereinafter referred to as Li—Co composite oxides). In addition, secondary particles of Li—Mn composite oxide are lightweight and absorb a large amount of oil, because the particles contain many pores. Thus, the amount of electroactive material which can be fed into a dimensionally limited cell must be restricted, thereby disadvantageously lowering the electrochemical capacity of a unit cell.

In recent years, U.S. Pat. No. 5,807,646 (Japanese Patent Application Laid-Open (kokai) No. 9-86933) has proposed measures to counter the aforementioned problem. Specifically, a mixture of a manganese compound and a lithium compound is shaped at a pressure of 500 kg/cm² or higher, heated, and crushed, to thereby produce an Li—Mn composite oxide having a tapping density (i.e., apparent density of powder in a container which is moved, e.g., vibrated under certain conditions) of 1.7 g/ml or higher. However, the disclosed tapping density is at most 1.9 g/ml, which is unsatisfactory.

The above official gazette also discloses the average particle size of secondary particles which are formed by aggregating primary particles of an Li—Mn composite oxide. However, even when the packing density of secondary particles is enhanced through the interaction between primary particles, secondary particles are disintegrated during the electrode material (paste) preparation step. Thus, controlling the average particle size of the secondary particles is not a fundamental counter-measure.

Some methods for producing a spinel-type Li—Mn composite oxide have already been disclosed. Japanese Patent Application Laid-Open (kokai) No. 9-86933 discloses such a method comprising burning a mixture of a manganese compound and a lithium compound at a high temperature, e.g., 250° C. to 850° C. Japanese Patent Application Laid-Open (kokai) No. 4-237970 discloses such a method comprising mixing a manganese compound, a lithium compound, and an oxide of boron which can be substituted by manganese and burning the resultant mixture at a high temperature, to thereby produce an Li—Mn—B oxide in which Mn atoms are partially substituted with B, and the Li—Mn—B oxide serves as a cathode electroactive material.

When the aforementioned materials are burned at high temperature in air or in an oxygen gas flow, the secondary particles obtained through crushing have a high average porosity (15% or more) and a low tapping density (1.9 g/ml or less). Thus, thus-obtained cathode electroactive materials cannot be charged into an electrode in a large amount, and thereby, a high discharge capacity cannot be attained.

Japanese Patent Application Laid-Open (kokai) No. 4-14752 discloses a cathode electroactive material employing a manganese oxide which is produced by mixing spinel-type lithium manganese oxide and titanium oxide and sintering the resultant mixture. However, disadvantageously, titanium oxide only reacts with lithium and manganese at 950° C. to 1000° C. or higher to form a melt, and a tapping density of 1.60 g/ml can be only attained by adding titanium oxide in an amount as large as 10 mass %.

DISCLOSURE OF INVENTION

An object of the present invention is to provide a cathode electroactive material for us in lithium ion secondary cells, which electroactive material has an excellent packing property and exhibits a high initial discharge capacity and a low decrease in discharge capacity after charging and discharging are repeated (hereinafter the property is referred to as high "capacity retention").

The present inventors have conducted extensive studies, and have solved the aforementioned problems by successfully densifying particles of an Li—Mn composite oxide. Specifically, the spinel-type Li—Mn composite oxide is burned and crushed. Then, a sintering agent is added to the resultant pulverized particles, and the particles are granulated and burned.

Accordingly, the present invention provides a cathode electroactive material for use in lithium ion secondary cells, a process for producing the material, a paste for producing an electrode and a cathode electrode for use in lithium ion secondary cells comprising a cathode electroactive material, and a lithium Ion secondary cell as described below.

[1] A cathode electroactive material for use in lithium ion secondary cells, wherein the cathode electroactive material predominantly comprises Li—Mn composite oxide particles with the spinel structure and particles of the electroactive material have an average porosity of 15% or less, the porosity being expressed by the following equation:

$$\text{Porosity (\%)} = (A/B) \times 100 \quad \ldots \quad (1)$$

(wherein A represents a total cross-section area of pores included in a cross-section of one secondary particle, and B represents the cross-section area of one secondary particle).

[2] A cathode electroactive material for use in lithium ion secondary cells as described in [1], wherein the average porosity is 10% or less and the average particle size of primary particles is 0.2 µm–3 µm.

[3] A cathode electroactive material for use in lithium ion secondary cells as described in [1], wherein the tapping density of the cathode electroactive material is 1.9 g/ml or more.

[4] A cathode electroactive material for use in lithium ion secondary cells as described in [3], wherein the tapping density of the cathode electroactive material is 2.2 g/ml or more.

[5] A cathode electroactive material for use in lithium ion secondary cells as described in [1], wherein the size of crystallites contained in the cathode electroactive material is 400 Å–960 Å.

[6] A cathode electroactive material for use in lithium ion secondary cells as described in [1], wherein the lattice constant determined with respect to the electroactive material is 8.240 Å or less.

[7] A cathode electroactive material for use in lithium ion secondary cells as described in [1], wherein the electroactive material is produced by granulating an Li—Mn composite oxide with the spinel structure serving as a predominant component comprising an oxide which is molten at 550° C.–900° C.: an element which forms the oxide: a compound comprising the element; an oxide which forms a solid solution or melts to react with lithium or manganese: an element which forms the oxide: or a compound comprising the element, and sintering the formed granules.

[8] A cathode electroactive material for use in lithium ion secondary cells as described in [7], wherein the oxide which is molten at 550° C.–900° C.: or the element which forms the oxide: or the compound comprising the element; or the oxide which forms a solid solution or melts to react with lithium or manganese: or the element which forms the oxide: the compound comprising the element, is at least one element selected from the group consisting of Bi, B, W, Mo, and Pb: or a compound comprising the element; a compound comprising $B_2O_3$ and LiF; or a compound comprising $MnF_2$ and LiF.

[9] A process for producing a cathode electroactive material for use in lithium ion secondary cells predominantly comprising an Li—Mn composite oxide with the spinel structure, which comprises adding, to a pulverized Li—Mn composite oxide with the spinel structure, an oxide which is molten at 550° C.–900° C.: an element which forms the oxide: a compound comprising the elements an oxide which forms a solid solution or melts to react with lithium or manganese: an element which forms the oxide: or a compound comprising the element; and mixing, to thereby form granules.

[10] A process for producing a cathode electroactive material for use in lithium ion secondary cells as described in [9], which process comprises sintering the granules in addition to forming granules.

[11] A process for producing a cathode electroactive material for use in, lithium ion secondary cells as described in [9], which process comprises, in addition to forming granules, sintering the granules by elevating the temperature of the granules from a sintering-shrinkage-initiating temperature to a temperature higher than the sintering-shrinkage-initiating temperature by at least 100° C. at a rate of at least 100° C./minute; successively maintaining the elevated temperature for one minute-10 minutes; and lowering the temperature to a sintering-initiating temperature at a rate of at least 100° C./minute.

[12] A process for producing a cathode electroactive material for use in lithium ion secondary cells as described in [11], wherein the sintering is carried out by use of a rotary kiln.

[13] A process for producing a cathode electroactive material for use in lithium ion secondary cells as described in [10], wherein at least one element selected from the group comprising of Bi, B, W, Mo, and Pb: the compound comprising the element; a compound comprising $B_2O$, and LiF; or a compound comprising $MnF_2$ and LiF is molten on the surfaces of particles of Li—Mn composite oxide so as to carry out the above described sintering process.

[14] A process for producing a cathode electroactive material for use in lithium ion secondary cells as described in [9], wherein pulverized Li—Mn composite oxide with the spinel structure has an average particle size of 5 μm or less.

[15] A process for producing a cathode electroactive material for use in lithium ion secondary cells as described in [9], wherein pulverized Li—Mn composite oxide with the spinel structure has an average particle size of 3 μm or less.

[15] A process for producing a cathode electroactive material for use in lithium ion secondary cells as described in [9], wherein granulation process is carried out through spray granulation, agitation granulation, compressive granulation, or fluidization granulation.

[17] A process for producing a cathode electroactive material for use in lithium ion secondary cells as described in [9], wherein at least one organic compound selected from the group consisting of acrylic resin, an isobutylene-maleic anhydride copolymer, poly(vinyl alcohol), poly(ethylene glycol), polyvinylpyrrolidene, hydroxypropyl cellulose, methyl cellulose, cornstarch, gelatin, and lignin is employed as a granulation aid during granulation process.

[18] A process for producing a cathode electroactive material for use in lithium ion secondary cells as described in [17], which process comprises binder removal process in air or in an oxygen-containing environment at 300° C. to 550° C.

[19] A cathode electroactive material for use in lithium ion secondary cells which is produced through a process as described in any one of [9] to [18].

[20] A paste for producing an electrode comprising a cathode electroactive material for use in lithium ion secondary cells as claimed in any one of claims [1] to [8].

[21] A cathode electrode for a lithium lon secondary cell, which the electrode comprises a cathode electroactive material for use in lithium ion secondary cells as described in any of [1] to [8] or [19].

[22] A lithium ion secondary cell equipped with a cathode electrode for a lithium ion secondary cell as described in [21].

[23] A lithium ion secondary cell as described in [22], which is formed into a coin-shaped cell, a coil cell, a cylinder-shaped cell, a box-shaped cell, or a lamination cell.

DETAILED DESCRIPTION OF INVENTION

Figure 1:
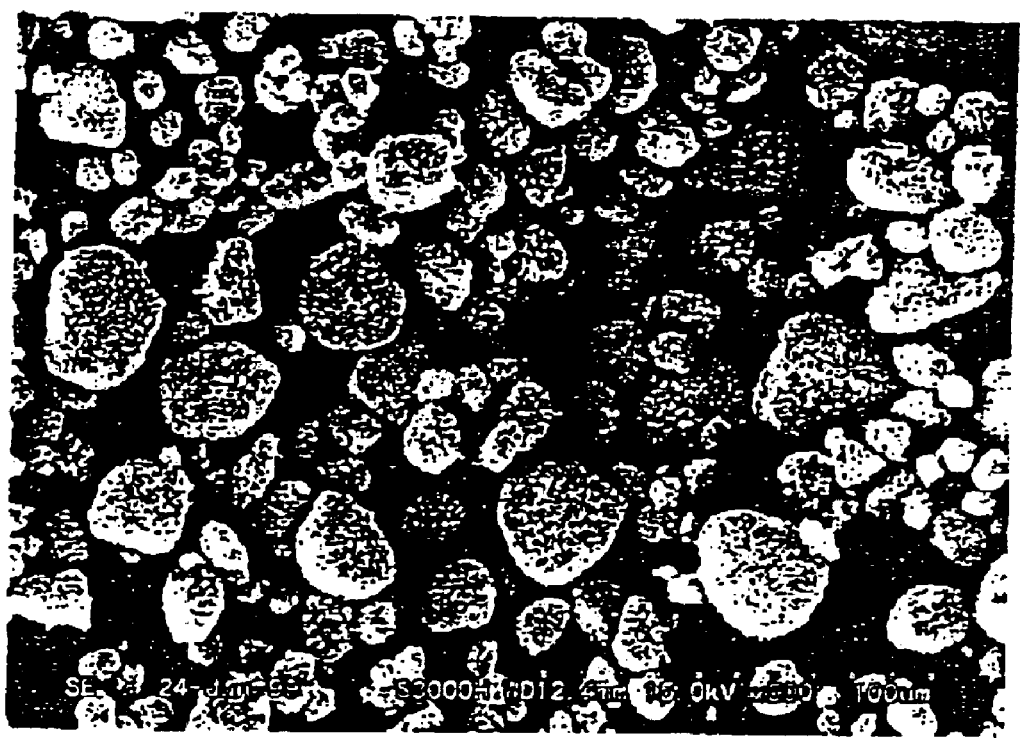
FIG. 1 shows an example (Example 14) of photographic images (scanning electron microscope, ×15,000) of the cathode electroactive material according to the present invention, which was granulated, burned, and size-adjusted.

The present invention will next be described in detail.

The present invention relates to a spinel-type Li—Mn composite oxide, in which secondary particles of the electroactive material have a porosity of 15% or less. The porosity is considerably reduced as compared with the electroactive material of a conventional electrode. The present invention also relates to a spinel-type Li—Mn composite oxide, in which secondary particles of the oxide have an average porosity of 10% or less. The electrochemical cycle characteristics of the oxide are more excellent than those of a conventional Li—Mn composite oxide.

The cathode electroactive material of the present invention comprising a spinel-type lithium-magnesium (Li—Mn)

composite oxide collectively refers to compounds represented by $LiMn_2O_4$, $Li_{1-x}Mn_{2-x}O_4 (0<x<0.2)$, or $Li_{1-x}Mn_{2-x-y}M_yO_4(0<x<0.2, 0<y<0.4)$ in which Mn is partially substituted by at least one element (represented by M in the formula) selected from the group consisting of chromium, cobalt, aluminum, nickel, iron, and magnesium.

The cathode electroactive material of the present invention for use in lithium ion secondary cells, in which the electroactive material predominantly comprises a spinel-type LL-Mn composite oxide and secondary particles of the electroactive material have an average porosity of 15% or less, the porosity of one secondary particle being calculated by employing the following equation:

$$\text{Porosity } (\%) = (A/B) \times 100 \quad \ldots \quad (1)$$

(wherein A represents a total cross-section area of pores included in a cross-section of one secondary particle, and B represents the cross-section area of one secondary particle).

In aforementioned Li—Mn composite oxide, the average porosity of the aforementioned cathode electroactive material is preferably 10% or less, and the average particle size of primary particles is 0.2 μm–3 μm.

In order to attain a tapping density of the cathode electroactive material in excess of 1.9 g/ml, the average porosity of the secondary particles is required to be 15% or less, preferably 13% or less, more preferably 10% or less. When sintering is carried out at a high temperature for a long period of time in a typical process for producing a composite oxide so as to reduce the average porosity of secondary particles to be as low as possible through sintering, primary particles are grown to large particles as sintering proceeds. Employment of the thus-produced material as a cathode electroactive material for a cell results in a decrease in the capacity retention of the cell. Thus, cells fabricated from the material have poor cell performance.

The present inventors have conducted extensive studies on a method for sintering with suppressing particle growth, and have found that sintering with suppressing particle growth can be brought about by elevating the temperature of granules from a sintering-shrinkage-initiating temperature to a temperature higher than the sintering-shrinkage-initiating temperature (as measured through thermo-mechanical analysis) by at least 100° C. at a rate of at least 100° C./minute; successively maintaining the elevated temperature for one minute to 10 minutes; and lowering the temperature to a sintering-initiating temperature at a rate of at least 100° C./minute.

The term "sintering-shrinkage-initiating temperature" herein refers to a shrinkage-initiating temperature measured through thermo-mechanical analysis. The aforementioned maintained temperature is required to be higher than the sintering-shrinkage-initiating temperature by at least 100° C. When the maintained temperature is elevated by less than 100° C. the sintering-shrinkage rate is small, leading to a longer sintering time. As a result, particles are grown to a primary particles size of more than 0.5 μm. The time for maintaining the elevated temperature is one minute or longer and 10 minutes or shorter so as to attain a primary particle size of 0.2 μm or more and 0.5 μm or less and excellent cell characteristics. The temperature is higher than the sintering-shrinkage-initiating temperature by at least 100° C. during the aforementioned sintering step. To maintain the temperature for less than one minute is not sufficient for thermal conduction, and particles having a primary particle size as small as less than 0.2 μm and poor crystallinity will be produced, thereby lowering the initial discharge capacity. When the time is in excess of 10 minutes, particles continue to grow after sintering is completed, thereby elevating the primary particle size and lowering the capacity retention percentage. Accordingly, in the present invention, the time for maintaining the temperature is preferably 2–8 minutes, more preferably 2–5 minutes.

Temperature elevating and lowering rates between the sintering-initiating temperature and the temperature for maintaining the elevated temperature are set to be at least 100° C./minute for the following reasons: The time during which the temperature is maintained in the temperature region where particles are grown is made as short as possible, for allowing only sintering to proceed, preventing growth of particles.

In order to attain a tapping density of the cathode electroactive material in excess of 2.2 g/ml, the average porosity of the secondary particles is required to be 10% or less, preferably 7% or less, more preferably 5% or less.

In the present invention, the size of crystallites comprised in the aforementioned cathode electroactive material is preferably 400 Å–960 Å. When the size is less than 400 Å, crystallinity is insufficient, thereby lowering the initial discharge capacity of the cell and the capacity retention percentage, whereas when the size is in excess of 960 Å, the capacity retention percentage drastically decreases. More specifically, the size is preferably 500 Å–920 Å, more preferably 700 Å–920 Å.

The lattice constant determined with respect to the cathode electroactive material of the present invention comprising a spinel-type Li—Mn composite oxide is preferably 8.240 Å or less. When the lattice constant is in excess of 8.240 Å, the capacity retention percentage drastically decreases. Accordingly, the lattice constant is preferably 8.235 Å or less, more preferably 8.233 Å or less.

The cathode electroactive material of the present invention predominantly comprising a spinel-type Li—Mn composite oxide is formed of dense granulated particles which are prepared by crushing a burned spinel-type Li—Mn composite oxide; adding a sintering agent (granulation accelerator) to the resultant pulverized particles (i.e., secondary particles which are formed by aggregating primary particles and preferably have an average particle size of 0.5 μm or less); and burning to granulate. The term "dense granulated particles" herein refers to particles in which no or few pores are contained between primary particles of the oxide. The cathode electroactive material of the present invention is formed of the aforementioned dense substance, and is formed by employment of a sintering agent mentioned in below.

Hereinafter the process for producing the cathode electroactive material of the present invention will be described.

The process for producing a spinel-type Li—Mn composite oxide comprises burning a mixture containing a manganese compound, a lithium compound, and an optional compound containing a hetero-element which can be substituted by manganese, in air or an oxygen gas flow at 300° C.–850° C. for at least one hour.

No particular limitation is imposed on the crystallinity of the spinel-type Li—Mn composite oxide, and an unreacted lithium compound or manganese compound may remain in the composite oxide. When the spinel-type Li—Mn composite oxide has a high crystallinity, the lattice constant thereof is not particularly limited. However, employment of a spinel-type Li—Mn composite oxide having a lattice constant of 8.240 Å or less as a cathode electroactive material prevents decrease in capacity retention percentage.

No particularly limitation is imposed on the raw material for producing the spinel-type Li—Mn composite oxide, and known manganese compounds such as manganese dioxide, dimanganese trioxide, trimanganese tetraoxide, hydrated manganese oxide, manganese carbonate, and manganese nitrate; and lithium compounds such as lithium hydroxide, lithium carbonate, and lithium nitrate are employed.

Preferably, manganese carbonate is suitable for the aforementioned manganese compound in that manganese carbonate readily reacts with a lithium compound at low temperature. An Li—Mn oxide of cathode electroactive material obtained from manganese carbonate imparts excellent properties to cells. In order to produce manganese-substituted Li—Mn—M (hetero-element) composite oxide represented by $Li_{1+x}Mn_{2-x-y}M_yO_4$, at least one element selected from the group consisting of chromium, cobalt, aluminum, nickel, Iron, and magneseium is added to the aforementioned manganese compound and lithium compound serving as the raw materials. Any M-containing compound (hetero-element) can be used so long as the compound forms the aforementioned oxide through thermal reaction, and the M-containing compound may be added to the manganese compound and lithium compound during thermal reaction.

No particular limitation is imposed on the method for crushing and pulverizing secondary particles of the aforementioned spinel-type Li—Mn composite oxide, and known crushers and pulverizers can be employed. Examples include a medium-stirring type pulverizer, a ball mill, a paint shaker, a jet-mill, and a roller mill. Crushing and pulverizing may be performed in a dry manner or a wet manner. No particular limitation is imposed on the solvent employed in the wet-manner crushing and pulverizing, and solvents such as water and alcohol may be employed.

Particle size of the crushed and pulverized spinel-type Li—Kn composite oxide is important in view of acceleration of sintering. The particle size measured by means of a laser particle size distribution measurement apparatus is preferably 5 $\mu$m or less. More preferably, no coarse particles having a size 5 $\mu$m or more is contained, and contained particles have an average particle size of 2 $\mu$m or less. Still more preferably, no coarse particles having a size more than 3 $\mu$m is contained, and contained particles have an average particle size of 1.5 $\mu$m or less. The particle size is further preferably 0.5 $\mu$m or less, yet further preferably 0.3 $\mu$m or less, particularly preferably 0.2 $\mu$m or less.

No particular limitation is imposed on the method for mixing a sintering agent with the crushed and pulverized spinel-type Li—Mn composite oxide. For example, mixing may be carried out by use of a medium-stirring type crushing machine, a ball mill, a paint shaker, or a mixer. Mixing may be performed in a dry manner or a wet manner. The sintering agent may be added to the Li—Mn composite during crushing and pulverizing the oxide.

The sintering agent is not particularly limited, so long as it enables sintering of crushed and pulverized particles of the Li—Mn composite oxide for granulation of the particles. The sintering agent is preferably a compound which melts at 900° C. or lower. For example, the compound may be an oxide which melts at 550–900° C. or a precursor which may be converted into the oxide; or an oxide which forms a solid solution with lithium or manganese or reacts with lithium or manganese to form a melt, or a compound which may be converted into the oxide.

The sintering agent, for example, may be a compound comprising an element such as Bi, B, W, Mo, or Pb. Such compounds may be employed in combination. The sintering agent may be a compound comprising $B_2O_3$ and LiF, or a compound comprising $MnF_2$ and LiF. The sintering agent is more preferably a compound comprising Bi, B, or W, since such a compound greatly exerts sintering (sintering-shrinkage) effect.

Examples of Bi compounds include bismuth trioxide, bismuth nitrate, bismuth benzoate, bismuth hydroxyacetate, bismuth oxycarbonate, bismuth citrate, and bismuth hydroxide. Examples of B compounds include boron sesquioxide, boron carbide, boron nitride, and boric acid. Examples of W compounds include tungsten dioxide and tungsten trioxide. The amount of a sintering agent which is added to the composite oxide is 0.0001–0.05 mol (as reduced to metallic element in the agent) on the basis of 1 mol of Mn in the Li—Mn composite oxide. When the amount is less than 0.0001 mol, the sintering agent exerts no sintering (sintering-shrinkage) effect, whereas when the amount is in excess of 0.05 mol, the initial capacity of the electroactive material comprising the composite oxide becomes low. The amount to be added is preferably 0.005–0.03 mol.

The sintering agent may be used in the form of powder, or may be dissolved in a solvent and used in the form of solution. When the sintering agent is employed in the form of powder, the agent preferably has an average particle size of 50 $\mu$m or less, more preferably 10 $\mu$m or less, much more preferably 3 $\mu$m or less. The sintering agent is preferably added to the crushed composite oxide particles before granulation and sintering of the particles. Alternatively, after granulation of the particles, resultant granules may be impregnated with the sintering agent at a temperature at which the agent melts, and then sintering may be carried out.

A sintering agent often remains after the sintering step in the cathode material for use in cells. For example, the aforementioned sintering agent used in the producing process of the present invention is detected by analysis to remain in the cathode electroactive material.

A method for granulation will next be described.

Granulation may be carried out by use of the aforementioned sintering agent through spray granulation, flow granulation, compression granulation, or stirring granulation. The granulation may be carried out in combination with medium-flow drying or medium-vibration drying.

In the present invention, no particular limitation is imposed on the method for granulation so long as dense secondary particles (including granulated particles) are formed. Stirring granulation and compression granulation are particularly preferred in consideration of production of secondary particles having a high density. Spray granulation is also particularly preferred in consideration of production of granules having a round shape. Examples of stirring granulation apparatuses include a vertical granulator (product of Paurec) and Spartanryuzer (product of Fuji Paudal). Examples of compression granulation apparatuses include a roller compactor (model: MRCP-200, product of Kurimoto Tekko). Examples of spray granulation apparatuses include a mobile-minor-type spray dryer (product of Ashizawaniro Atomizer).

No particular limitation is imposed on the size of secondary particles to be granulated. When the average size of the granulated secondary particles is very large, the particles may be lightly crushed and pulverized immediately after granulation or after sintering of the particles, and then subjected to size-regulation such as classification, to thereby obtain the granules of desired size. Typically, secondary particles having an average particle size of 10–20 $\mu$m are preferred.

In order to enhance granulation efficiency, an organic granulation aid maybe added.

Examples of these granulation aids include an acrylic resin, an isobutylene-maleic anhydride copolymer, poly (vinyl alcohol), poly(ethylene glycol), polyvinylpyrrolidone, hydroxypropyl cellulose, methyl cellulose, cornstarch, gelatin, and lignin.

Although the granulation aid may be added in the form of powder, the granulation aid is preferably added by spraying it dissolved in water or an organic solvent such as alcohol in view of granulation efficiency. The granulation aid is added preferably in an amount of five parts by weight or less on the basis of 100 parts by weight of a mixture of the sintering agent and the spinel-type Li—Mn composite oxide, more preferably two parts by weight or less.

A method for sintering the granulated secondary particles will next be described.

The binder contained in the granulated secondary particles is removed at 300–550° C. for 10 minutes or more in air or in an oxygen-containing gas flow. The amount of residual carbon in the binder-free granules is preferably 0.1% or less.

In order to proceed sintering with suppressing growth of particles, binder-removed granules are fired in air or an oxygen-containing gas flow at 550° C. to 900° C. for one minute or longer. Under these conditions, the sintering agent is maintained molten on Li—Mn composite oxide particles, thereby densifying secondary particles through sintering.

In the present invention, binder-free granulated particles is burned in air or an oxygen-containing gas flow under the following conditions so as to suppress growth of particles and proceed sintering. Specifically, the procedure includes elevating the temperature from a sintering-shrinkage-initiating temperature measured through thermo-mechanical analysis to a temperature higher than the sintering-shrinkage-initiating temperature by at least 100° C. at a rate of at least 100° C./minute; successively maintaining the elevated temperature for one minute–10 minutes; and lowering the temperature to a sintering-initiating temperature at a rate of at least 100° C./minute, to thereby attain sintering and densify the secondary particles. Temperature elevation and lowering between ambient temperature and the sintering-shrinkage-initiating temperature may be 10° C./min or less as has been conventionally employed.

Even when the aforementioned organic granulation aid is not employed, sintering of the granules may be carried out in air or in an oxygen-gas-flow atmosphere in a manner as described above, to thereby produce dense secondary particles.

The cathode electroactive material of the present invention and the cathode electroactive material produced through the method for producing the same according to the present invention are formed into a cathode electrode of lithium ion secondary cells, and performance of the cell are evaluated through methods similar to those employed for a conventional Li—Mn composite oxide.

Hereinafter, example methods for employing the cathode electroactive material of the present invention as a material of a cathode electrode in the non-aqueous secondary cell will next be described.

The cathode material is produced through the following procedure: kneading the cathode electroactive material, a conductivity-imparting agent such as carbon black or graphite, and a binder such as polyvinylidenefluoride dissolved in a solvent (e.g., N-methylpyrrolidone) in predetermined proportions; applying the resultant electrode paste to a current-collecting material; drying; and pressing the paste-applied material by use of a roll press or a similar apparatus. The current-collecting material may be a known metallic current-collecting material such as aluminum, stainless steel, or titanium.

In the non-aqueous secondary cell according to the present invention, an electrolytic salt contained in an electrolytic solution may be a known fluorine-containing lithium salt. For example, $LiPF_6$, $LiBF_4$, $LIN(CF_3SO_2)_2$, $LiAsF_6$, $LiCF_3SO_3$, or $LiC_4F_9SO_3$ may be employed. The electrolytic solution employed in the non-aqueous secondary cell is produced by dissolving at least one species of the aforementioned known fluorine-containing lithium salts in a non-aqueous electrolytic solution. The aforementioned non-aqueous solvent for the non-aqueous electrolytic solution is not particularly limited, so long as the solvent is chemically or electrochemically stable and aprotic.

Examples of such solvents include carbonic acid esters such as dimethyl carbonate, propylene carbonate, ethylene carbonate, methyl ethyl carbonate, methyl propyl carbonate, methyl isopropyl carbonate, methyl butyl carbonate, diethyl carbonate, ethyl propyl carbonate, diisopropyl carbonate, dibutyl carbonate, 1.2-butylene carbonate, ethyl isopropyl carbonate, and ethyl butyl carbonate; oligoethers such as triethylene glycol methyl ether and tetraethylene glycol dimethyl ether; aliphatic esters such as methyl propionate and methyl formate; aromatic nitriles such as benzonitrile and tolunitrile; amides such as dimethylformamide; sulfoxides such as dimethyl sulfoxide; lactones such as y-butyrolactone; sulfur compounds such as sulforane; N-vinylpyrrolidone; N-methylpyrrolidone; and phosphoric acid esters. Of these, carbonic acid esters, aliphatic esters, or ethers are preferred.

In the non-aqueous secondary cell of the present invention, the material of an anode electrode is not particularly limited, so long as it can reversibly occlude or release lithium ions. For example, the material may be lithium metal, lithium alloy, carbon material (including graphite), or metal-chalcogen.

A method for evaluation of electrode characteristics will next be described.

The cathode electroactive material, Vulcan XC-72 (product of Cabot Corp.) serving as a conductive material, and an ethylenetetrafluoride resin serving as a binder are mixed in proportions by weight of 50:34:16, and the resultant mixture is swollen with toluene over 12 hours. The swollen mixture is applied onto a current-collecting material comprising aluminum expanded metal, and shaped at a pressure of 2 t/cm$^2$, and then toluene is dried, to thereby produce a cathode electrode. An anode electrode is produced from lithium foil.

Propylene carbonate and dimethyl carbonate are mixed at a ratio by volume of 1:2, and $LiPF_4$ is dissolved in the resultant mixture in a concentration of 1 mol/liter, to thereby produce an electrolytic solution. A separator formed of polypropylene is employed. In order to prevent micro short circuit due to formation of dendrite in the anode electrode, for example, silica fibrous filter paper QR-100 (product of Advantec Toyo Co.) serving as a reinforcing material is employed in combination. A 2016-type coin-shaped cell is fabricated from the cathode electrode, the anode electrode, the electrolytic solution, the separator, and the reinforcing material. The thus-fabricated cell is subjected to charging and discharging test of 500 cycles in a thermostat of 60° C. Measurement conditions are as follows: constant-current-constant-voltage charging and constant-current discharging; charging or discharging rate 1C (charging time: 2.5 hours); and scanning voltage 3.1–4.3 V.

BEST MODE FOR CARRYING OUT THE INVENTION

The present invention is described below by referring to Examples and Comparative Examples, however, the present invention should not be construed as being limited thereto.

The characteristics of the cathode electroactive material as shown in examples below and Tables 1–3 was evaluated according to the following procedures.

1) Average Particle Size and Specific Surface Area

The powder was dispersed in a 0.2% aqueous solution of Demol P (Kao Corporation) by the application of ultrasound, and the particle size distribution was measured by means of a laser particle size distribution measuring apparatus (GRANULOMETER, Model HR 850, product of CILAS).

2) Tapping Density

The tapping density was measured by vertically vibrating 2000 times at an amplitude of 8 mm using a tapping machine (type KRS-409, Kuramochi Kagaku Kiki Seisakusho).

3) Porosity

The cathode electroactive material was embedded in resin by mixing and hardening the cathode electroactive material and thermosetting resin, and the resin solid was cut by means of a microtome. The cut surface was mirror-polished, and the thus-polished surface was observed by Scanning Electron Microscope (SEM). The cross-section area of one secondary particle (B) calculated from the obtained SEM photographic image and the total cross-section area of all pores (A) included in the cross-section area of one secondary particle were determined by means of an image-analyzer. The porosity (C) (%) of one secondary particle was calculated according to the following formula to determine the average porosity from the average of 50 secondary particles selected at random:

$$C(\%) = (A/B) \times 100.$$

4) Crystallite Size

The crystallite size was determined by employing Sherrer's formula from the peak corresponding to a (111) face as measured under the following conditions through X-ray diffractometry.

On the assumption that the crystallites are cubic and constant in size, broadening of the diffraction peak depending on the size of crystallite was calculated on the basis of the half-width. Monocrystalline silicone was pulverized using a sample mill made of tungsten carbide and sieved to a size of 44 $\mu$m or less. The apparatus constant calibration curve was determined by the employment the sieved powder as an external standard.

[Measurement Apparatus and Method]

The measurement apparatus employed to analyze the size of the crystallites was a Rad-type goniometer (Rigaku Denki) (measurement mode: continuous), and the analysis software employed was RINT 2000 Series (application software, Rigaku Denki).

The measurement conditions were as follows: X-ray; CuK$\alpha$ ray, output power; 50 kV. 180 mA: slit widths (3 points): ½°, ½°, and 0.15 mm, scanning method; 2θ/θ, scanning rate: 1°/min; measuring range (2θ); 17–20°, and step: 0.004°. The measurement accuracy for the crystallite size fell within ±30 Å.

5) Lattice Constant

The lattice constant was obtained through a method described by J. B. Nelson and D. P. Riley (*Proc. Phys. Soc.*, 57, 160 (1945)).

6) Specific Surface Area

Specific Surface Area was obtained according to BET method.

7) Shape of Granulated Particles

Granules of cathode electroactive materials were photographed by SEM. Through analysis of the obtained images, roundness (roundness=4π[area/(circumference)$^2$]) and aspect ratio (aspect ratio=absolute maximum length of needle/diagonal width) of secondary particles were obtained. The average values of 200 secondary particles were measured for each sample.

EXAMPLE 1

Manganese carbonate having a specific surface area of 22 m$^2$/g (C2-10; product of Chuo Denki Kogyo) and lithium carbonate (3N, product of Honjo Chemical) were mixed together at an element ratio of 0.51 (Li/Mn) using a ball mill. The resultant mixture was heated from room temperature to 650° C. at a rate of 200° C./hour in air. The temperature was maintained for four hours, to thereby obtain an Li—Mn composite oxide. X-ray diffraction analysis apparatus (XRD) revealed that in addition to Li—Mn composite oxide, a trace amount of dimanganese trioxide was also contained in the synthesized product. The average particle size of the product measured by means of a laser particle size distribution measuring apparatus was 10 $\mu$m, and the specific surface area thereof was 7.7 m$^2$/g.

The obtained Li—Mn composite oxide having spinal structure was dispersed in ethanol solvent and pulverized with a wet ball mill such that the average particle size became 0.5 $\mu$m. Measurement revealed that particles having a particle size of 3 $\mu$m or more were not contained, and that the specific surface area of the particles was 27.8 m$^2$/g. The powder was mixed with bismuth oxide having an average particle size of 2 $\mu$m so as to attain a Bi/Mn element ratio of 0.0026. The resultant mixture was granulated with Spartan-ryuzer RMO-6H (Fuji Paudal).

An aqueous solution of polyvinyl alcohol (1.5 parts by weight), serving as a granulation aid, was added to the mixed powder (100 parts by weight) of the Li—Mn composite oxide and bismuth oxide, and was then followed by granulation for 16 minutes. The obtained granulated substance was lightly crushed and then pulverized in a mixer, to thereby obtain powder having an average particle size of 15 $\mu$m as measured by a pneumatic classifier. The tapping density of the size-adjusted granules was 1.65 g/ml.

The resultant granules were left to stand under atmospheric condition, in air, at 500° C. for two hours, to thereby remove the binder from the granules (i.e., to decompose polyvinyl alcohol in the granules). Thereafter, the resultant granules were sintered at 750° C. in air to 750° C. at a rate of 200° C./hour, and then maintained at 750° C. for 20 hours, to hereby produce a cathode electroactive material. Inductively coupled plasma emission spectroscopy (ICP-AES) confirmed that elemental Bi derived from the bismuth oxide was present in the electroactive material in an amount corresponding to the amount of bismuth oxide employed.

The average porosity of the obtained cathode electroactive material was found to be 11.2%. The tapping density and crystallite size of the material were 1.96 g/ml and 880 Å, respectively. The lattice constant measured with respect to the cathode electroactive material was 8.233 Å.

Using the thus-obtained cathode electroactive material, a coin-shaped cell was fabricated as follows. The cathode electroactive material, carbon black serving as a conductor, and polyvinylidenefluoride in N-methyl-2-pyrrolidone were kneaded in proportions by weight of 80:10:10. The resultant substance was applied to aluminum foil and then pressed, to thereby obtain a cathode electrode. Lithium foil having a predetermined thickness was used as an anode electrode. Propylene carbonate and dimethyl carbonate were mixed at a volume ratio of 1:2. LiPF$_6$ was dissolved in the obtained mixed liquid at a concentration of 1 mol/liter. The resultant solution was used as an electrolyte. Using the thus-obtained cathode electrode, anode electrode, and electrolyte as well as a polypropylene separator and a glass filter, a 2016-type coil-shaped cell was fabricated.

The fabricated cell was tested at 60° C. over subjection to 100 charge-discharge cycles, each performed at a charge-discharge rate of 1C and within a voltage range of 3.0 V to 4.2 V. Table 1 shows the initial discharge capacity and the capacity retention percentage (%) as measured after the 100-cycles test with the other results of measurement.

EXAMPLE 2

The procedure of Example 1 was repeated, except that electrolytically produced manganese dioxide serving as a manganese source, to thereby synthesize an Li—Mn composite oxide. As is similar to Example 1, porosity, tapping density, crystallite size, and lattice constant of the secondary particles, and electrode performance were evaluated. The results are shown in Table 1.

EXAMPLE 3

Manganese carbonate, lithium carbonate, and aluminum hydroxide were mixed together at proportions by element of 1.02:1.967:0.013 (Li/Mn/Al) using a ball mill. The resultant mixture was heated from room temperature to 650° C. at a rate of 200° C./hour in air. The temperature was maintained at 650° C. for four hours, to thereby synthesize an Li—Mn composite oxide. XRD revealed that in addition to Li—Mn composite oxide, a trace amount of dimanganese trioxide was also contained in the synthesized product. The average particle size of the product measured by means of a laser particle size distribution measuring apparatus was 10 µm.

The produced Li—Mn composite oxide was crushed to particles having an average particle size of 0.5 µm. Boron oxide was added to the particles so as to adjust the element ratio (B/Mn) to 0.0208, and the mixture was granulated. Subsequently, the procedure of Example 1 was repeated, except that binder-free granulates were burned at 750° C. for 0.5 hour. The results of evaluation are shown in Table 1.

EXAMPLE 4

The procedure of Example 3 was repeated, except that the element ratio (B/Mn) was adjusted to 0.009 and binder-free granules were burned at 760° C. for 0.5 hour. The results of evaluation are shown in Table 1.

EXAMPLE 5

The procedure of Example 3 was repeated, except that the element ratio (B/Mn) was adjusted to 0.006 and binder-free granules were burned at 770° C. for 0.5 hour. The results of valuation are shown in Table 1.

EXAMPLE 6

The procedure of Example 1 was repeated, except that binder-free granules were burned at 760° C. for 20 hours. The results of evaluation are shown in Table 1.

EXAMPLE 7

The procedure of Example 1 was repeated, except that tungsten trioxide was used instead of bismuth oxide; tungsten trioxide was added in an element ratio (W/Mn) of 0.0208; and binder-free granules were burned at 750° C. for 20 hours. The results of evaluation are shown in Table 1.

EXAMPLE 8

The Li—Mn composite oxide which had been synthesized in Example 1 was further heated from room temperature to 750° C. in air at a heating rate of 200° C./hour, and the thus-heated oxide was maintained at 750° C. for 20 hours, to thereby crystallize. The procedure of Example 1 was repeated, except that crystallized Li—Mn composite oxide was used, boron oxide was used instead of bismuth oxide; boron oxide was added in an element ratio (B/Mn) of 0.0208; and binder-free granules were burned at 750° C. for 0.5 hour. The results of evaluation are shown in Table 1.

EXAMPLE 9

The procedure of Example 3 was repeated, except that Li—Mn composite oxide particles having an average particle size of 3.5 µm and a specific surface area of 10 $m^2/g$ were employed as ungranulated particles. The results of evaluation are shown in Table 1.

EXAMPLE 10

The procedure of Example 3 was repeated, except that manganese carbonate, lithium carbonate, and aluminum hydroxide were mixed together at proportions by element of 1.03:1.967:0.013 (Li/Mn/Al) using a ball mill, to thereby synthesize an Li—Mn composite oxide. The results of evaluation are shown in Table 1.

TABLE 1

| | | | | | Cathode electroactive material | | | | | 60° C. Cell performance | |
|---|---|---|---|---|---|---|---|---|---|---|---|
| No | Mol ratio of added sintering agent | Burning conditions after binder-free | Porosity % | Tapping density g/ml | Specific surface area $m^2/g$ | Crystallite size Å | Lattice constant Å | Roundness | Aspect ratio | Initial capacity mAh/g | Capacity retention after 100 cycles % |
| Ex. 1 | Bi/Mn 0.0026 | 750° C. × 20 hr | 11.2 | 1.96 | 1.8 | 880 | 8.233 | 0.76 | 1.31 | 129 | 84 |
| Ex. 2 | Bi/Mn 0.0026 | 750° C. × 20 hr | 12.0 | 1.93 | 1.8 | 890 | 8.234 | 0.75 | 1.33 | 118 | 78 |
| Ex. 3 | Bi/Mn 0.0208 | 750° C. × 0.5 hr | 6.5 | 2.16 | 1.2 | 780 | 8.232 | 0.78 | 1.28 | 127 | 85 |
| Ex. 4 | Bi/Mn 0.0090 | 760° C. × 0.5 hr | 2.3 | 2.33 | 1.0 | 910 | 8.231 | 0.78 | 1.29 | 125 | 83 |
| Ex. 5 | Bi/Mn 0.0060 | 770° C. × 0.5 hr | 1.8 | 2.35 | 0.9 | 930 | 8.230 | 0.77 | 1.28 | 126 | 81 |
| Ex. 6 | Bi/Mn 0.0026 | 760° C. × 20 hr | 9.1 | 2.05 | 1.2 | 910 | 8.231 | 0.78 | 1.29 | 115 | 87 |

TABLE 1-continued

| No | Mol ratio of added sintering agent | Burning conditions after binder-free | Cathode electroactive material | | | | | | | 60° C. Cell performance | |
|---|---|---|---|---|---|---|---|---|---|---|---|
| | | | Porosity % | Tapping density g/ml | Specific surface area m²/g | Crystallite size Å | Lattice constant Å | Roundness | Aspect ratio | Initial capacity mAh/g | Capacity retention after 100 cycles % |
| Ex. 7 | Bi/Mn 0.0208 | 750° C. × 20 hr | 6.1 | 2.18 | 1.1 | 800 | 8.239 | 0.78 | 1.28 | 124 | 76 |
| Ex. 8 | Bi/Mn 0.0208 | 750° C. × 0.5 hr | 9.8 | 2.02 | 1.5 | 820 | 8.240 | 0.76 | 1.30 | 128 | 80 |
| Ex. 9 | Bi/Mn 0.0208 | 750° C. × 0.5 hr | 8.5 | 2.07 | 1.3 | 750 | 8.233 | 0.79 | 1.31 | 126 | 85 |
| Ex. 10 | Bi/Mn 0.0208 | 750° C. × 0.5 hr | 6.3 | 2.15 | 1.2 | 750 | 8.228 | 0.76 | 1.29 | 116 | 89 |

EXAMPLE 11

The procedure of Example 1 was repeated, except that binder-free granules were burned at 830° C. for 20 hours. The results of evaluation are shown in Table 2.

EXAMPLE 12

The procedure of Example 3 was repeated, except that manganese carbonate, lithium carbonate, and aluminum hydroxide were mixed together at proportions by element of 0.99:1.967:0.013 (Li/Mn/Al) using a ball mill, to thereby synthesize an Li—Mn composite oxide. The results of evaluation are shown in Table 2.

EXAMPLE 13

The procedure of Example 3 was repeated, except that the average particle size of granulated particles was adjusted to 65 μm. The results of evaluation are shown in Table 2.

EXAMPLE 14

Figure 2:
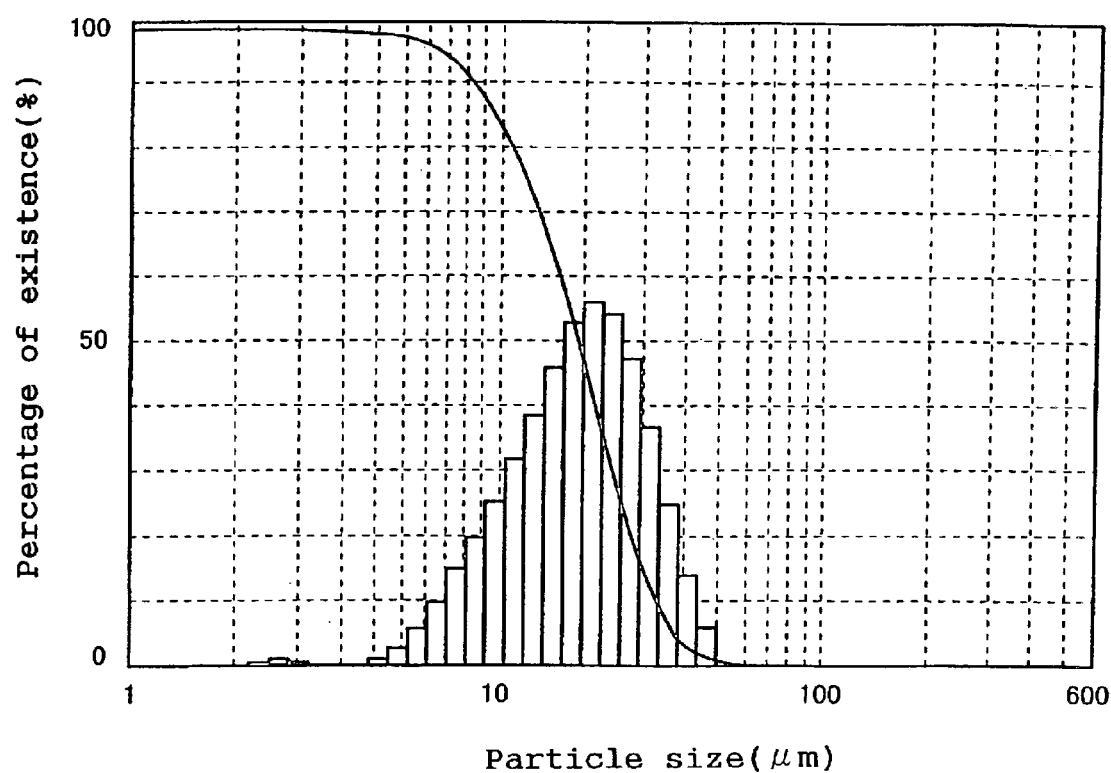
FIG. 2 shows an example (Example 14) of particle size distribution of the cathode electroactive material according to the present invention, which was granulated, burned, and size-adjusted.

The procedure of Example 1 was repeated, except that the element ratio (Bi/Mn) was adjusted to 0.0020. The results of evaluation are shown in Table 2. The obtained cathode electroactive material, which was granulated, burned, and size-adjusted, was observed by a scanning electron microscope (SEK)(×15,000). As shown in FIG. 1, the particles have been found to be spherical. The particle size distribution of these particles is shown in FIG. 2.

COMPARATIVE EXAMPLE 1

The procedure of Example 1 was repeated, except that non-granulated particles of the Li—Mn composite oxide before undergoing granulation had an average particle size of 6.0 μm. The results of evaluation are shown in Table 2.

COMPARATIVE EXAMPLE 2

Lithium carbonate and electrolytically synthesized manganese dioxide having an average particle size of 20 μM were mixed together at an element ratio (Li/Mn) of 0.51 using a ball mill, and the mixture was heated to 760° C. at a heating rate of 100° C./hour and the heated mixture was maintained at 760° C. for 24 hours, to thereby synthesize a cathode electroactive material. The thus-obtained cathode electroactive material was evaluated in a manner similar to that employed in Example 1. The results are shown in Table 2.

COMPARATIVE EXAMPLE 3

The procedure of Example 1 was repeated, except that granulation was performed without adding a sintering agent. The results of evaluation are shown in Table 2.

COMPARATIVE EXAMPLE 4

The procedure of Example 3 was repeated, except that granules were burned at 750° C. for 20 hours. The results of evaluation are shown in Table 2.

TABLE 2

| No | Mol ratio of sintering agent added | Burning conditions after binder-free | Cathode electroactive material | | | | | | | 60° C. Cell performance | |
|---|---|---|---|---|---|---|---|---|---|---|---|
| | | | Porosity % | Tapping density g/ml | Specific surface area m²/g | Crystallite size Å | Lattice constant Å | Roundness | Aspect ratio | Initial capacity mAh/g | Capacity retention after 100 cycles % |
| Ex. 11 | Bi/Mn 0.0026 | 830° C. × 20 hr | 2.0 | 2.34 | 0.8 | 960 | 8.235 | 0.74 | 1.35 | 127 | 71 |
| Ex. 12 | Bi/Mn 0.0208 | 750° C. × 0.5 hr | 6.4 | 2.14 | 1.4 | 770 | 8.243 | 0.73 | 1.34 | 131 | 74 |
| Ex. 13 | Bi/Mn 0.0208 | 750° C. × 0.5 hr | 6.6 | 2.48 | 1.2 | 790 | 8.233 | 0.84 | 1.25 | 128 | 85 |
| Ex. 14 | Bi/Mn 0.0200 | 750° C. × 20 hr | 15.0 | 1.83 | 2.0 | 850 | 8.235 | 0.74 | 1.32 | 131 | 84 |
| Comp. Ex. 1 | Bi/Mn 0.0026 | 750° C. × 20 hr | 16.6 | 1.74 | 2.5 | 930 | 8.233 | 0.72 | 1.33 | 120 | 77 |
| Comp. Ex. 2 | — | 760° C. × 24 hr | 16.0 | 1.71 | 6.8 | 600 | 8.239 | 0.66 | 1.45 | 110 | 73 |

TABLE 2-continued

| | Mol ratio | | Cathode electroactive material | | | | | | | 60° C. Cell performance | |
|---|---|---|---|---|---|---|---|---|---|---|---|
| No | of sintering agent added | Burning conditions after binder-free | Porosity % | Tapping density g/ml | Specific surface area m²/g | Crystallite size Å | Lattice constant Å | Roundness | Aspect ratio | Initial capacity mAh/g | Capacity retention after 100 cycles % |
| Comp. Ex. 3 | — | 750° C. × 20 hr | 19.6 | 1.62 | 4.8 | 580 | 8.232 | 0.71 | 1.32 | 125 | 83 |
| Comp. Ex. 4 | Bi/Mn 0.0208 | 750° C. × 20 hr | 5.4 | 2.20 | 0.3 | >1000 | 8.234 | 0.69 | 1.39 | 122 | 54 |

EXAMPLE 15

Manganese carbonate, lithium carbonate, and aluminum hydroxide were mixed together at proportions by element of 1.02:1.967:0.013 (Li/Mn/Al) using a ball mill. The resultant mixture was heated from room temperature to 650° C. at a rate of 200° C./hour in air. The temperature was maintained at 650° C. for four hours, to thereby synthesize an Li—Mn composite oxide. XRD revealed that in addition to Li—Mn composite oxide, a trace amount of dimanganese trioxide was also contained in the synthesized product. The average particle size of the product measured by means of a laser particle size distribution measuring apparatus was 10 μm.

Boron oxide was added to the obtained Li—Mn composite oxide so as to attain an element ratio (B/Mn) of 0.0208. The resultant mixture was dispersed in ethanol solvent and pulverized with a wet ball mill such that the average particle size became 0.3 μm. The resultant mixture was granulated with Spartanryuzer RMO-6H (Fuji Paudal).

An aqueous solution of polyvinyl alcohol (1.5 parts by mass), serving as a granulation aid, was added to the mixed powder (100 parts by mass) of the Li—Mn composite oxide and boron oxide, and was then followed by granulation for 16 minutes. The obtained granulated substance was lightly crushed and then pulverized in a mixer, to thereby obtain powder having an average particle size of 15 μm as measured by a pneumatic classifier. The tapping density of the size-adjusted granules was 1.60 g/ml.

The resultant granules were left to stand under atmospheric condition at 500° C. for two hours, to thereby remove binders of the granules (i.e., to decompose polyvinyl alcohol in the granules). Thermo-mechanical analysis of the binder-free granulates revealed that sintering-shrinkage-initiating temperature of the granulates was 660° C.

Subsequently, binder-free granulates were sintered by use of a rotary kiln under the following conditions.

The temperature of the uniform-heat zone of the rotary kiln was adjusted to 780° C. Feeding rate of granules, and rotation speed and inclination of the rotary kiln were tuned such that the binder-free granules pass through the uniform-heat zone for three minutes. Time required for transferring the binder-free granules from the inlet to the uniform-heat zone and that required for transferring the granules from the uniform-heat zone to the outlet of the kiln were 6.3 minutes, respectively.

The average porosity of the obtained cathode electroactive material was found to be 2.1%. The longest particle size of each of 500 primary particles was on an SEM image, and the average particle size was found to be 0.40 μm.

Using the thus-obtained cathode electroactive material, a coin-shaped cell was fabricated as in the same way as in Example 1.

The fabricated cell was tested at 60° C. over 100 charge-discharge cycles, each performed at a charge-discharge rate of 1C and within a voltage range of 3.0 V to 4.2 V.

Table 3 shows the initial discharge capacity and the capacity retention percentage (%) as measured after the 100-cycle test.

EXAMPLE 16

The temperature of the uniform-heat zone of the rotary kiln was adjusted to 780° C. The procedure of Example 15 was repeated, except that feeding rate of granules and rotation speed and inclination of the rotary kiln were tuned such that the debindered granules pass through the uniform-heat zone for nine minutes. The results of evaluation are shown in Table 3.

EXAMPLE 17

Manganese carbonate, lithium carbonate, and vapor-phase-synthesized alumina were mixed together at proportions by element of 1.02:1.967:0.013 (Li/Mn/Al) using a ball mill. The resultant mixture was heated from room temperature to 650° C. at a rate of 200° C./hour in air. The temperature was maintained at 650° C. for four hours, to thereby synthesize an Li—Mn composite oxide. XRD revealed that in addition to Li—Mn composite oxide, a trace amount of dimanganese trioxide was also contained in the synthesized product. The average particle size of the product measured by means of a laser particle size distribution measuring apparatus was 10 μm.

Boron oxide was added to the obtained Li—Mn composite oxide so as to attain an element ratio (B/Mn) of 0.0104. The resultant mixture was dispersed in ion-exchange water, and pulverized with a medium-stirring micro-pulverizer such that the average particle size became 0.18 μm. Granulation aid (Isobam 104 Kuraray Co., Ltd.) was added to the resultant slurry in an amount, of 1.5 masse based on the Li—Mn composite oxide, and dry-granulation was carried out by use of a disk-rotating spray-drier. The granulated substance was found to be spherical particles having an average particle size of 18.3 μm and a tapping density of 1.54 g/ml.

The thus-prepared granulates were allowed to stand under atmospheric condition at 500° C. for two hours for removal of binders. The binder-free granules were sintered by use of a rotary kiln under conditions similar to those employed in Example 15.

The obtained cathode electroactive material was found to have an average porosity of 1.7%, an average particle size of 0.27 μm, a tapping density of 2.40 g/ml, and a specific surface area (BET) of 0.8 m²/g. A coin-shaped cell was fabricated from the cathode electroactive material in a manner similar to that employed in Example 15. The cell performance is shown in Table 3.

EXAMPLE 18

The procedure of Example 15 was repeated, except that the temperature of the uniform-heat zone of a rotary kiln was adjusted to 850° C. The results of evaluation are shown in Table 3.

EXAMPLE 19

The procedure of Example 17 was repeated, except that the temperature of the uniform-heat zone of a rotary kiln was adjusted to 850° C. The results of evaluation are shown in Table 3.

COMPARATIVE EXAMPLE 5

The procedure of Example 15 was repeated, except that binder-free granulates were heated from 650° C. to 750° C. at a rate of 10° C./minute, maintained at 750° C. for 0.5 hour, sintered, and cooled to 650° C. at 10° C./minute. The obtained cathode electroactive material was evaluated in a manner similar to that employed in Example 15. The results of evaluation are shown in Table 3.

COMPARATIVE EXAMPLE 6

The procedure of Comparative Example 5 was repeated, except that sintering was carried out at 750° C. for 20 hours. The results of evaluation are shown in Table 3.

COMPARATIVE EXAMPLE 7

The temperature of the uniform-heat zone of the rotary kiln was adjusted to 780° C. The procedure of Example 15 was repeated, except that feeding rate of granules, and rotation speed and inclination of the rotary kiln were tuned such that the binder-free granules pass through the uniform-heat zone for 0.5 minute, and time required for transferring the binder-free granules from the inlet to the uniform-heat zone and that required for transferring the granules from the uniform-heat zone to the outlet of the kiln were 1.5 minutes, respectively. The results of evaluation are shown in Table 3.

TABLE 3

| | | Cathode electroactive material | | | | | | | 60° C. Cell performance | |
| --- | --- | --- | --- | --- | --- | --- | --- | --- | --- | --- |
| No | Sintering conditions | Porosity % | Tapping density g/ml | Av. primary particle size μm | Specific surface area m²/g | Lattice constant Å | Roundness | Aspect ratio | Initial capacity mAh/g | Capacity retention after 100 cycles % |
| Ex. 15 | 780° C. × 3 min 120° C./min Rotary kiln | 2.1 | 2.35 | 0.40 | 0.8 | 8.233 | 0.77 | 1.31 | 127 | 90 |
| Ex. 16 | 780° C. × 9 min 120° C./min Rotary kiln | 1.6 | 2.44 | 0.50 | 0.4 | 8.236 | 0.75 | 1.29 | 128 | 87 |
| Ex. 17 | 780° C. × 3 min 120° C./min Rotary kiln | 1.7 | 2.40 | 0.28 | 0.8 | 8.235 | 0.99 | 1.02 | 127 | 91 |
| Ex. 18 | 850° C. × 9 min 120° C./min Rotary kiln | 1.4 | 2.51 | 2.66 | 0.3 | 8.237 | 0.73 | 1.29 | 128 | 86 |
| Ex. 19 | 850° C. × 9 min 120° C./min Rotary kiln | 1.3 | 2.52 | 2.41 | 0.2 | 8.237 | 0.75 | 1.29 | 128 | 87 |
| Comp. Ex. 5 | 750° C. × 0.5 hr 10° C./min Box furnace | 6.5 | 2.14 | 0.55 | 1.2 | 8.232 | 0.78 | 1.28 | 127 | 85 |
| Comp. Ex. 6 | 750° C. × 20 hr 10° C./min Box furnace | 2.3 | 2.33 | 0.84 | 0.3 | 8.235 | 0.78 | 1.29 | 125 | 70 |
| Comp. Ex. 7 | 780° C. × 0.5 min 120° C./min Rotary kiln | 13.1 | 1.92 | 0.19 | 2.1 | 8.233 | 0.77 | 1.28 | 118 | 81 |

Measurement and Analysis of Shape of Granulated Particles

Through analysis of the secondary particles produced in Examples 1 to 19 and Comparative Examples 1 to 7 shown in Tables 1 to 3, roundness (roundness=$4\pi[\text{area}/(\text{circumference})^2]$) and aspect ratio (aspect ratio=absolute maximum length of needle/diagonal width) of secondary particles were obtained. The cathode electroactive materials according to the present invention were found to have a roundness of 0.7 or more, and an aspect ratio of 1.35 or less.

INDUSTRIAL APPLICABILITY

The cathode electroactive material of the present invention is definitely different from conventional electroactive material comprising secondary particles formed on the basis of cohesive force, since the cathode electroactive material of the present invention is produced through granulation and sintering. The material is formed of particles which are dense and spherical and exhibit excellent packing characteristics to an electrode, as compared with cathode electroactive material obtained through a conventional process for producing the same. In addition, the cathode electroactive material serves as a material which enhances initial discharge capacity and capacity retention percentage of secondary cells even at high temperature.

The process of the present invention for producing a cathode electroactive material includes adding a sintering agent forming a melt at high temperature to the Li—Mn composite oxide, to thereby densify secondary particles. The process of the present invention is also advantageous as compared with conventional processes in that excellent cell performance can be attained even when crystallites have a size which is detrimental to initial capacity and cycling characteristics. During densification of secondary particles, there is a problem that primary particles are grown to a particle size more than 0.5 μm, thereby lowering initial capacity and cycling characteristics. The present invention can solve the problem by adding a sintering agent forming a melt at high temperature to the Li—Mn composite oxide, and provides a cathode electroactive material having high packing characteristics and excellent cell performance.

The lithium ion secondary cell of the present invention employs a cathode electroactive material having an excellent packing property, accordingly, exhibits high initial capacity and capacity retention percentage at high temperature.

What is claimed is:

1. A process for producing a cathode electroactive material for use in lithium ion secondary cells which comprises adding, to a pulverized Li—Mn composite oxide with a spinel structure, at least one component selected from the group consisting of an oxide which is molten at 550° C.–900° C., an oxide which forms a solid solution with lithium or manganese having a melting point of 550° C.–900° C., an oxide which melts to react with lithium or manganese to form a compound having a melting point of 550° C.–900° C., an element which forms one of these oxides, and a compound which converts into one of these oxides; to thereby form granules and, wherein the granulation process is carried out through spray granulation, agitation granulation, compressive granulation, or fluidization granulation.

2. A process for producing a cathode electroactive material for use in lithium ion secondary cells as claimed in claim 1, which process comprises sintering the granules in addition to forming granules.

3. A process for producing a cathode electroactive material for use in lithium ion secondary cells as claimed in claim 1, which process comprises, in addition to forming granules, sintering the granules by elevating the temperature of the granules from a sintering-shrinkage-initiating temperature to a temperature higher than the sintering-shrinkage-initiating temperature by at least 100° C. at a rate of at least 100° C./minute; successively maintaining the elevated temperature for one minute-10 minutes; and lowering the temperature to the sintering-shrinkage-initiating temperature at a rate of at least 100° C./minute.

4. A process for producing a cathode electroactive material for use in lithium ion secondary cells as claimed in claim 3, wherein the sintering is carried out by use of a rotary kiln.

5. A process for producing a cathode electroactive material for use in lithium ion secondary cells as claimed in claim 2, wherein the oxide, the element or the compound comprises at least one selected from the group consisting of Bi, B, W, Mo, and Pb; a compound comprising $B_2O_3$ and LiF; or a compound comprising $MnF_2$ and LiF.

6. A process for producing a cathode electroactive material for use in lithium ion secondary cells as claimed in claim 1, wherein pulverized Li—Mn composite oxide with the spinel structure has an average particle size of 5 μm or less.

7. A process for producing a cathode electroactive material for use in lithium ion secondary cells as claimed in claim 1, wherein pulverized Li—Mn composite oxide with the spinel structure has an average particle size of 3 μm or less.

8. A process for producing a cathode electroactive material for use in lithium ion secondary cells as claimed in claim 1, wherein at least one organic compound selected from the group consisting of acrylic resin, an isobutylene-maleic anhydride copolymer, poly(vinyl alcohol), poly(ethylene glycol), polyvinylpyrrolidene, hydroxypropyl cellulose, methyl cellulose, cornstarch, gelatin, and lignin is employed as a granulation aid during granulation process.

9. A process for producing a cathode electroactive material for use in lithium ion secondary cells as claimed in claim 8, which process comprises removing the granulation aid in air or in an oxygen-containing environment at 300° C. to 550° C.

10. A cathode electroactive material for use in lithium ion secondary cells which is produced through a process as claimed in claim 1.

* * * * *